Sept. 16, 1958 S. A. JACQUES ET AL 2,852,670
PROGRAMMING DEVICE
Filed May 8, 1957 3 Sheets-Sheet 1
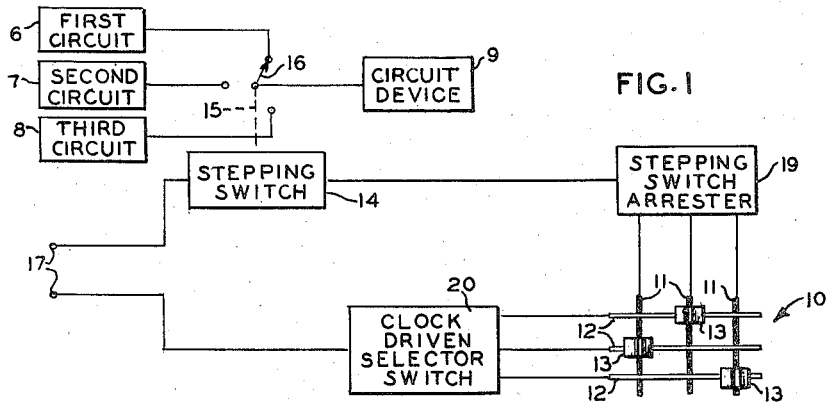
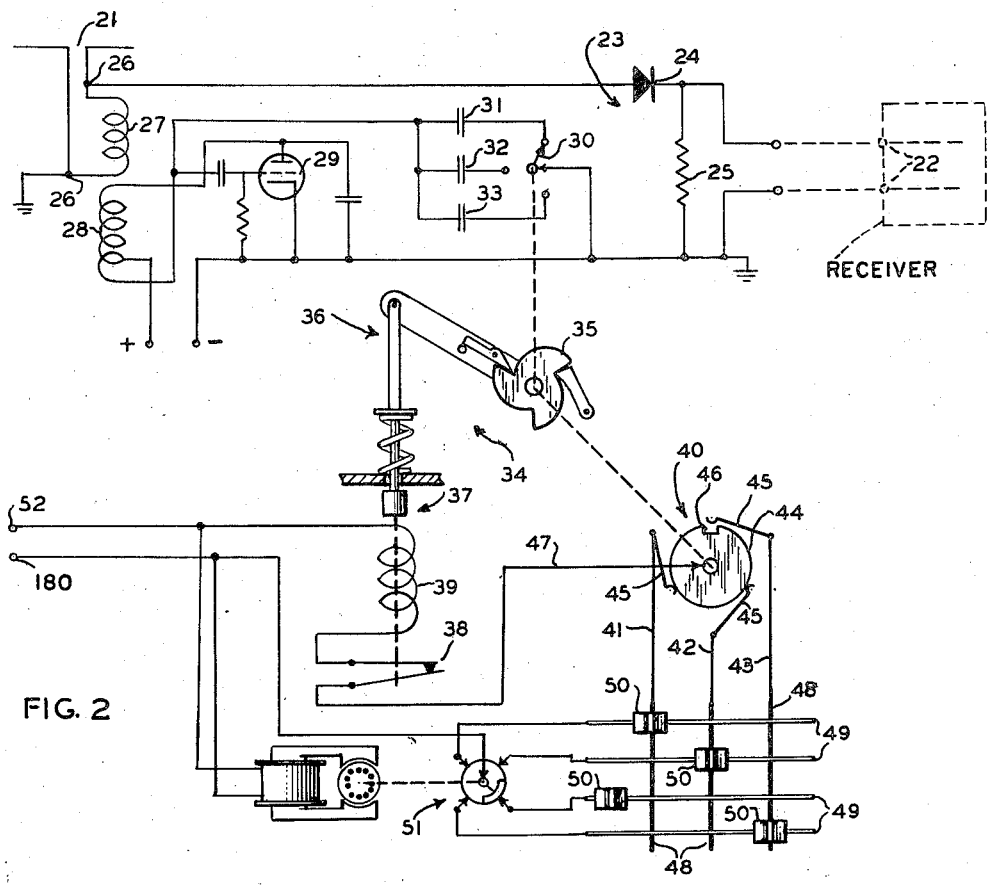
INVENTORS
STANLEY A. JACQUES
ALFRED J. MONROE
BY
ATTORNEY

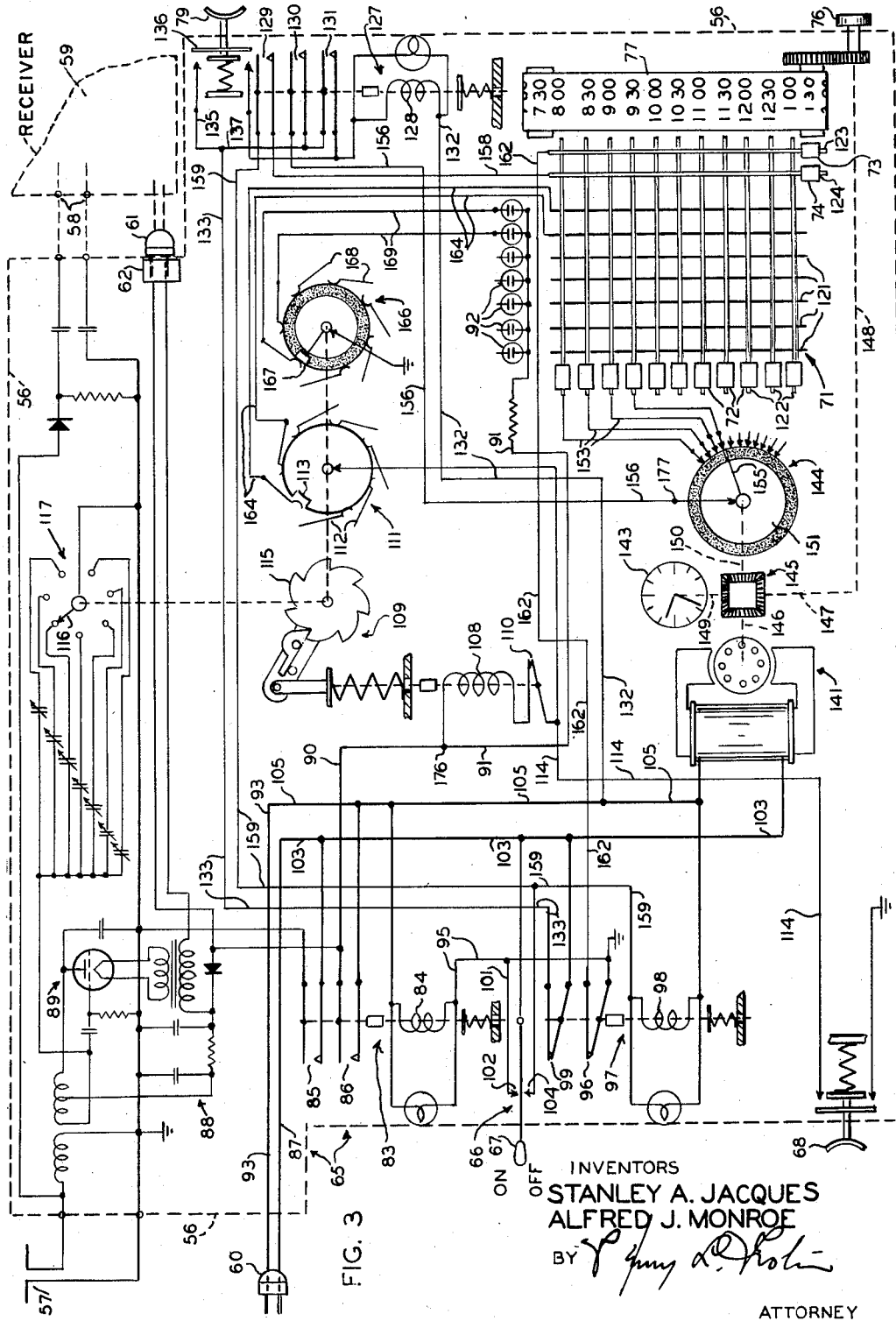

Sept. 16, 1958   S. A. JACQUES ET AL   2,852,670
PROGRAMMING DEVICE

Filed May 8, 1957   3 Sheets-Sheet 3

INVENTORS
STANLEY A. JACQUES
ALFRED J. MONROE

BY

ATTORNEY

United States Patent Office

2,852,670
Patented Sept. 16, 1958

2,852,670

PROGRAMMING DEVICE

Stanley A. Jacques, Los Angeles, and Alfred J. Monroe, Mar Vista, Calif.

Application May 8, 1957, Serial No. 657,781

13 Claims. (Cl. 250—20)

This invention relates to selector devices by means of which preselection can be made of a sequence or program of successive different positions to which a movable controlled member may be brought at certain times. In its more basic aspects the system is based on employment of a conventional stepping switch for operating the movable controlled member, and a novel, complex control circuit system for the stepping switch, including a convenient, presettable device by means of which the position program of the controlled member may be selected and set up, and clock-driven means for detecting, at preselected time intervals, whether a change of position is ordered by the setting of the device, and, in the event of an ordered change, initiating operation of the stepping switch control circuit to initiate stepping switch operation. The system also includes means for automatically terminating operation of the stepping switch when the controlled member has reached the ordered position.

One field of utility to which the device is peculiarly applicable is that of automatic programming of the ones of a group of radiating stations, such as television or broadcasting, so that at a series of preselected times, the programs of a preselected series of the different stations will be reproduced by the set. In this special field, the basic invention is utilized to actuate a selector switch arranged to accomplish, at each preselected time an automatic conditioning of the receiver set to reproduce the program of a certain station. An important object of the invention, additional to the broader one suggested above, is provision of a novel system that will accomplish this function, in the nature of automatic timing, wherein the positioned member referred to above is a station-selective switch.

In general the system last referred to, in accordance with the invention takes the form of an oscillator coupled with the antenna circuit for heterodyning with carrier frequencies energizing that circuit, the oscillation being selectively adjustable by means of the station-selector switch that is operated by the automatic positioning system, to a number of different frequencies. These frequencies respectively are such as to heterodyne the respective and different frequency carriers of different radiating stations to a single or common carrier frequency, which, being fed to the signal input of a conventional receiver circuit tuned to that common frequency, is demodulated with reproduction of its signal content. Thus, upon tuning a conventional receiving circuit to the common carrier frequency, and presetting a time-controlled sequential switching of the oscillator coupled to the antenna circuit to adjust its frequency to that suited to a particular station at a certain time, automatic selection of station programs to be reproduced at certain times will be accomplished.

In its preferred form the automatic station selector takes the form of an automatic carrier frequency selector device that is wholly accessory in character, and that is connectible to any receiver set, by simple interposition between an antenna and the normal carrier frequency input, that is the conventional antenna terminal of the receiver, without any alteration of the latter, and which, by heterodyning with the selected carrier frequency, the output of an oscillator that forms part of the device, will produce and apply to the receiver set input, a heterodyned output of the selected common frequency for which the receiver has been tuned or otherwise set. By arranging the oscillator system of the accessory device for selectively producing different frequencies respectively predetermined to produce a single output frequency by heterodyning respectively with different preselected carrier frequencies, and arranging the oscillator system for automatic timed selection of the different predetermined heterodyne frequencies, the auxiliary device is readied to perform its intended carrier-selective function by the simple expedient of adjusting the receiver set to the selected common frequency of the auxiliary device, and thereafter switching the oscillator system of the device to produce the proper frequency for a selected one of the preselected carrier frequencies.

The device is perhaps most useful in the field of television receivers, since the relatively small number of channels, or carrier frequencies available in any given location, and the frequency differences between them minimizes the possibility of image frequencies and eliminates need for a frequency discriminating circuit between the antenna and the mixing circuit with which the auxiliary device is provided and wherein the heterodyning function is performed. However, such a circuit may be employed if necessary or desirable. In one of its forms herein disclosed, many refinements adapted to highly convenient use have been included.

In the accompanying drawings:

Fig. 1 is a block diagram showing the general system of arrangements embodying the invention.

Fig. 2 is a schematic diagram of a relatively simple control circuit arrangement embodying the invention.

Fig. 3 is a diagram of a complex circuit arrangement embodying the basic invention and including numerous novel modifications particularly adapted to the special field of automatic receiving set programming.

Figure 4:
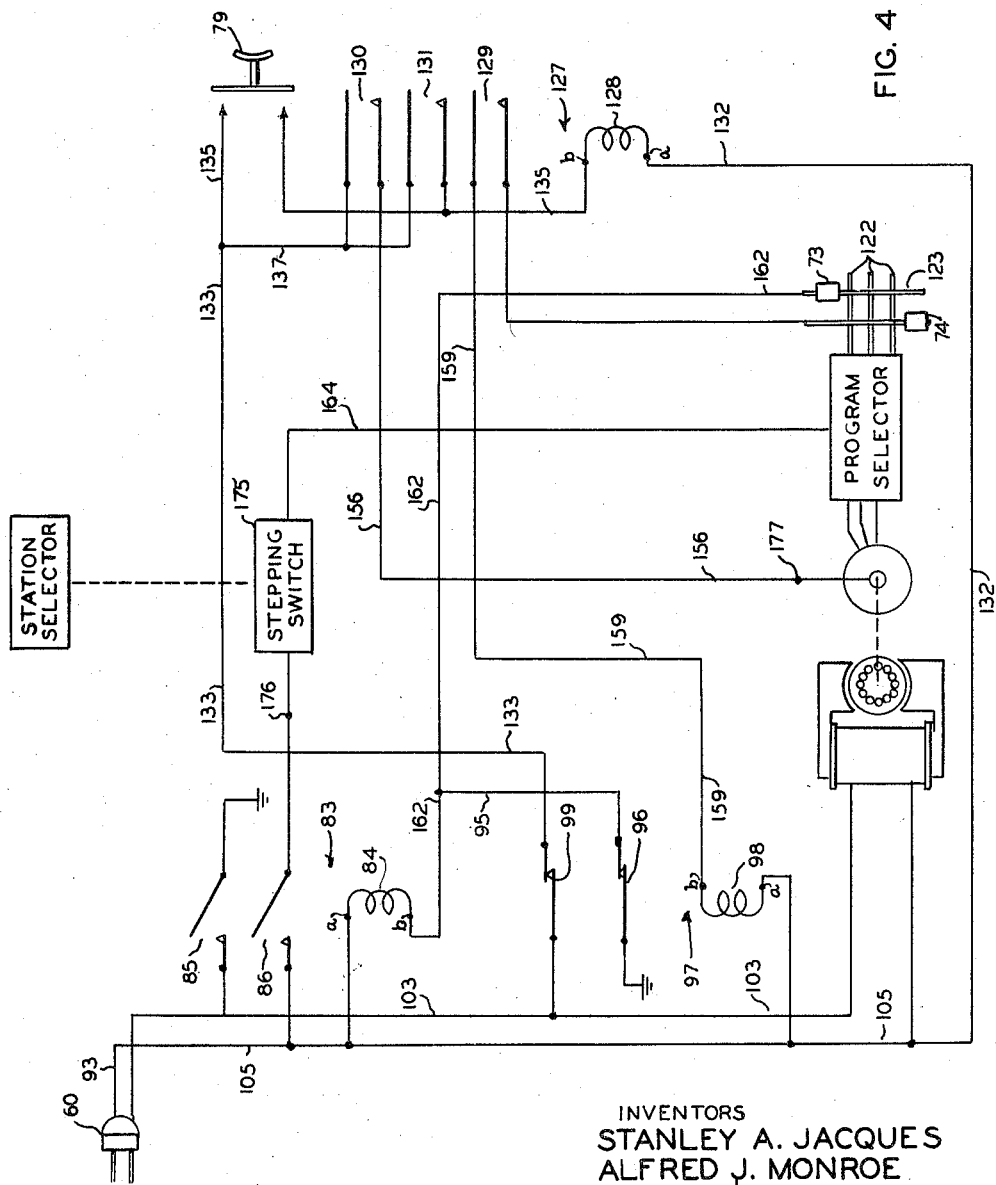
Fig. 4 is a simplified schematic, showing the system for controlling automatic starting and stopping of the device.

Referring to Fig. 1, it is assumed that either one of three circuits, 6, 7, 8 is capable of cooperation with a circuit device 9, and that it is desirable to set up a preselected program, in accordance with which, one circuit will be connected to device 9 for a certain period of time, and at the expiration of that time period the connected circuit will be disconnected and the second or third circuit connected, and further, that it is desirable to provide for preselection of the sequence in which the circuits are connected.

The program ordering device 10 includes a series of circuit selector conductors 11, equal in number to the number of circuits among which selection is to be made, here three, and respectively assigned to the different circuits 6, 7, 8, and a second series of "time" conductors 12, the number of which corresponds to the times at which changes are to occur, and shown as three.

Along each of time conductors 12 is slidable a contactor 13 arranged to make contact between a time conductor 12 and a circuit conductor 11, so that by positioning contactors 13, a correlation may be established between the circuit 6, 7, or 8 assigned to the conductor 11 into contact with which a contactor 13 is brought, and a time corresponding to the particular contactor 13 and the time conductor 12 along which it is movable.

The movable member of a stepping switch 14 is connected, as at 15 to advance the contactor 16 of a selector switch, which is the movable, controlled member, by increments to successively connect circuits 6, 7 and 8 to device 9. The switch, as will appear, will operate incrementally so long as it is connected in circuit with a power source, as 17. In accordance with the invention, a stepping switch operation arrester 19, and a clock driven selector switch 20 are so connected in circuit with the programming device 10 and stepping switch 14 in such arrangement that when clock driven switch 20 makes contact with the one of time conductors 12 with which a circuit conductor 11 is connected by a contactor, and while the circuit 6, 7 or 8 assigned to that conductor 11 is disconnected from device 9 at switch 16, energization of stepping switch 14 is established through arrester 19, which condition is maintained until switch 16 connects the ordered circuit 6, 7 or 8 to device 9. At the time of that connection arrester 19 opens the stepping switch energizing circuit and operation terminates until the clock driven switch 20 reestablishes the stepping circuit by connecting the next time conductor 12 to source 17, if the latter is connected to a circuit conductor 13 other than that through which the circuit previously was established. This will cause the system to repeat and connect the circuit 6, 7 or 8 selected by the setting of the contactor 13 of the newly connected time conductor.

Fig. 2 generally conforms to Fig. 1, and discloses an extremely simple form of the radiation station selector described. In this arrangement a receiver antenna is designated 21 and the terminals of an amplifying and demodulating receiving set antenna circuit are designated 22. In accordance with the invention the circuit 23 for connecting antenna 21 to the input terminals 22 is in the nature of a mixing circuit 23 including a mixing network of diode 24 and grounded output resistor 25 across which appears the heterodyne frequency of the antenna-received carrier frequency, introduced at first mixing circuit input 26, and the oscillator frequency which is introduced at a second mixing circuit input comprising a coupling transformer secondary winding 27 which is inductively coupled to the inductance winding 28 of an oscillator circuit that includes a suitable voltage amplifier such as tube 29. Selectively connectible in tank circuit relation with inductance winding 28, by positioning a switch contactor 30, are condensers 31, 32, 33, respectively having such capacitances as to provide when one or the other is connected in the oscillator tank circuit, an oscillator frequency suited to heterodyne with a different one of three selected carrier frequencies to produce a single resultant carrier frequency, to which the receiver having signal input terminals is assumed to have been tuned, the three carrier frequencies being assumed to be those of three radiating stations to be received selectively by the set.

In accordance with the invention the moving part of a stepping switch assembly 34, shown as a ratchet wheel 35 having three teeth in correspondence to the three positions of selector switch contactor 30, is mechanically connected to that contactor to position it to connect a different condenser 31, 32 or 33 in the oscillator tank in the three different positions of wheel 35. A conventional pawl drive for wheel 35 is indicated at 36 and is actuable by a solenoid 37, which additionally operates an interrupting switch 38, as is well known in stepping switch practice, switch 38 being series connected with the winding 39 of solenoid 37, so that each advancing stroke of pawl mechanism 36 is terminated by deenergization of the solenoid, followed by spring return of the pawl mechanism. Series connected with solenoid winding 39 in its energizing circuit, and with interrupter switch 38, is a selector or stepping switch operation arrester device 40. Device 40 is arranged to connect in series with winding 39 and switch 38 all but one of three of a first set of circuit leads 41, 42 and 43, and is driven by the moving part, wheel 35, of stepping switch 34 to successively disconnect one lead 41, 42 or 43 and to reconnect a previously disconnected one at each advance of wheel 35. Device 40 is shown as a circular, rotatable, conductive body 44 against the periphery of which bear spring contactors 45 that respectively are connected to leads 41, 42 and 43. A gap at 46 successively registers with the different contactors, thereby accomplishing the indicated disconnection. Body 44 is rigidly connected to the selector switch connector 30, which is connected to the condensers 31, 32 and 33 in succession as the body 44 rotates the gap 46 past the contactors 45. The different leads 41, 42, 43 are respectively connected with different ones of a series of "station" conductors 48 which correspond to the "circuit" conductors 11 of Fig. 1, as body 44 rotates.

A series of "time" conductors 49, four in number, is provided, and manually settable contactors 50, slidable along conductors 49 are provided for setting up a program by selection of the interconnected ones of conductors 48 and 49.

The time conductors 49 are selectively and sequentially connected to one supply input terminal 180 by a clock driven switch 51. The end of solenoid winding 39 opposite that connected to switch 38 being connected to a second supply input terminal 52, it will be seen that with the interrupter switch 38 closed and clock driven switch 51 connected to supply input terminal 180, through an interconnected pair of conductors 48 and 49 to the lead 41, 42 or 43 that is, not registered with gap 46, solenoid winding 39 will be energized to advance stepping switch wheel 35, selector switch contactor 30, and body 44 to their next succeeding positions. Thus one of condensers 31, 32, 33 will be connected in the oscillation tank circuit and the program of the corresponding one of the three radiating stations for which the system is arranged will be reproduced by the receiving set. In the event that gap 46 in that resulting position of members 35, 40 and 44 registers with a contactor other than the one connected to terminal 180 through the connected pair of conductors 48 and 49 and switch 51, the stepping switch will repeat, advancing members 35, 40 and 44 to their next positions. When gap 46 registers with the one of contactors 45 that is so connected to terminal 180 through an interconnected pair of time and station conductors 42, 41, the energizing circuit for winding 39 will be opened, since no other interconnected pair of conductors 48, 49 will then be connected to terminal 180 by switch 51.

It will be understood that condensers, as 31, 32, 33, the number of teeth of stepping switch wheel 35, the number of contactors 45, and conductors 48, may be increased to any extent that is desirable or practical to accommodate the system to more radiating stations, also that the number of time conductors 49 may similarly be increased to accommodate practically any length of programming. Also it will be understood that drive speed of switch 51 and spacing of its fixed contacts may be selected to provide suitable intervals between times at which station selection changes may be accomplished. Intervals of fifteen minutes or a half hour are suggested as suitable and it will also be understood that the contactors 50 may be so set that no change of station is effected at any one or more of the times at which changes can be effected.

It will be seen that the system of Fig. 2, which is intended only to disclose the basic nature of the system in simple form, has certain disadvantages, such as cycling repetition of the preset program, lack of provision for manual change of station except by reset of one or more of contactors 50, and lack of provision for automatic start and stop.

The system disclosed in Fig. 3 makes provision for all of the above, and has other refinements particularly adopting the system to automatic, time controlled operation in accordance with a preselected program setup in advance on a selector matrix and lasting for several hours, say from eight p. m. to one a. m., with provision for station changing on hours and half hours.

First briefly describing the general nature and operation characteristics of the system of Fig. 3; in connection with manual controls with which the device is provided; as suggested before, the programming device is ideally suited to construction as a unit, generally indicated by dotted outline 56, and adapted for plug-in connection between a receiving antenna 57 and the antenna input circuit terminals 58 of a conventional receiver set, as a television or radio receiver, indicated by dotted outline 59. Somewhat similarly the device may be plugged in to a commercial electrical supply by a power supply input plug 60, and again may be plugged between such a supply and the usual power input supply plug 61 of the receiver set, a feed through plug receptacle 62 being provided in the device for the purpose, and with provision on automatically commencing and terminating supply of power to the set in correlation with selected program commencement and termination times.

The device, hereafter generally designated 65 and preferably contained in a cabinet, is provided with a three position switch 66 of which the operating member 67 is spring biased to a central, neutral position from which it is movable to "on" and "off" positions. Function of switch 66 is to permit cancellation or interruption of automatic programming operation and selective establishment of a manual station selection condition. The first two of these functions are accomplished by momentarily moving member 57 to the "off" position, and the third by moving it to "on" position after it has been moved to "off" position. A pushbutton switch 68 provides for manual station selection when the manual condition has been established by switch 66, and under certain limitations to be explained, also permits temporary manual override of a station selected by operation of the automatic system, manual selection of a substitute station, and automatic reestablishment of the preselected program at the next program change time.

A presettable matrix time and station selector device 71 is provided, being of similar nature to that of Fig. 2, but having capacity for seven radiating stations, eleven timed program functions, and additionally providing for automatic starting and stopping of a program at preset times, and respectively accompanied by establishment and disestablishment of power supply to all of the drive circuits except the timing and a starting relay circuit, as well as of power supply to a receiver set connected to the device plug 62.

Programming device 71 has a series of time-station contactors or selectors 72, an "on" time selector 73 and an "off" time selector 74. A knob 76 is manually rotatable for the purpose of selecting the particular times of day between which automatic programming is to take place, and an indicator belt 77, having times printed thereon and associated with device 71, is moved by rotation of knob 76 to indicate the times of day that have been so selected. Provision is made for indicating identity of a station the program of which is being reproduced. Pilot light indication of the instant condition of the device is provided.

Finally, a pushbutton switch 79 is provided for conditioning the circuitry of the device for automatic commencement of a preset program at the proper commencement time.

In operating the device a program is set up by contactors 72, 73 and 74. Pushbutton 79 then is depressed. If the program commencement time has not arrived the device will remain inactive until that time, at which it will activate itself as well as the connected receiver set. In the one case the preset program will be followed and the device and receiver set turned off at the time set for program ending. In the other case the remainder of the present program will be followed.

In the event that manual station selection is desired, after pushbutton 79 has been pushed and either before or after program commencement, switch actuator 67 is moved first to "off" then to "on" positions, and subsequently successive depressions of pushbutton 68 will successively and progressively change the station being reproduced. Thereafter automatic operation may be reestablished by depressing pushbutton 79, or the set device may be turned off altogether by momentarily moving control member 67 to "off" position. In fact this latter action can be effected at any time. Certain other changes of station operation possibilities will be described in connection with circuitry that simplifies their explanations.

An activating relay 83 includes a solenoid 84 and a pair of switches 85, 86 that are spring biased open and that are closed by energization of the solenoid. Switch 85 grounds one conductor 87 of the power input connected to plug 60, as well as terminals of other components that are connected to conductor 87. When closed, switch 86 connects a power supply 88 for the oscillator 89, a stepping switch energizing conductor 90, and a conductor 91 that supplies station indicating neon bulbs 92, all to the second power input line 93. Solenoid 84 has one terminal connected to the second power input supply line 93 and the other terminal is connectible to ground through a first branch lead 95 wherein is connected a switch 96 of a deactivating relay 97 that has a solenoid 98 and a second switch 99. Switches 96, 99 are spring biased closed and are opened by energization of solenoid 98. A second branch lead 101 connects the second terminal of solenoid 84 to the "on" contact 102 of the "on-manual"—"off" switch 66, and the contactor of that switch is connected by a bus lead 103 to the power input conductor 87 that is grounded while solenoid 84 is energized.

Solenoid 98 of deactivating relay 97 has one terminal connected to the "off" contact 104 of switch 87, so is connected to power line 87 through lead 103 when operator 67 is moved to "off" position, while its second terminal is connected to power line 93 by a bus lead 105.

It will be seen that with relays 83, 97 in the deenergized conditions shown, solenoid 84 is connected to power lead 93 but is disconnected from line 87 which then is isolated by open switch 85 from the grounded return branch lead 95. Momentary movement of switch operator 67 to its "on-manual" position energizes solenoid 84 by connecting its second terminal to line 87. The consequent closing of switch 85 establishes a holding circuit for solenoid 84 through switch 85, ground lead 95 and closed switch 96. Also, closing of switch 86 connects leads 90, 91 to power line 93, conditioning the device for station selection by means of pushbutton 68, as will be described.

The energizing and control circuit for the solenoid 108 of a stepping switch 109 includes an interrupter switch 110 and an arrester device 111 of the same general arrangement as in Fig. 2, but provided with seven contactors 112 in correspondence to the number of stations. In general it may now be stated that a station selection is accomplished by grounding of a stepping switch contactor 112 at a preselected time set on device 71, so that arrival of gap 113 of arrester 111 at registration with a contactor 112 that is grounded through device 71 arrests operation of stepping switch 109. For the manual operation now being described, a circuit lead 114 is connectible to ground by depressing manual station selector pushbutton 68, and thereupon a bypass of interrupter switch 110, arrester 111 and program device 71, is provided. Each depression and release of button 68 advances the moving part, wheel 115, of stepping switch 109, one position. Moving part 109 is mechanically connected to move the contactor 116 of the oscillator frequency selector switch 117 to the next succeeding position.

Termination of the manual selection condition described may be effected by deflection of switch operator 67 to "off" position. This energizes solenoid 98 of the deactivating relay 97 through lead 103 and "off" contact 104 of switch 66 on one side of the solenoid and through lead 105 on the other.

For automatic program operation provision is made to energize solenoid 84 at arrival of time for program commencement and energization of solenoid 98 at arrival of time for program ending, respectively to condition the receiver set 59, stepping switch 109 and neon indicators 92, for operation under control of device 71 and to deenergize the device and set by energizing deactivating relay solenoid 98.

Programming device 71 includes a series of "station" conductors 121, the number of which corresponds with the number of radiating station carrier frequencies for which the device 65 is to be used, shown as seven, and a series of "time" conductors 122, here eleven in number to correspond to the ten program periods for which the device is adapted, and assumed to be of one-half hour lengths. Device 71 also includes a "time on" conductor 123 along which contactor 73 is movable and a "time off" conductor 124 along which contactor 74 is movable, respectively to preset ordered times for start and stop of a program, during which stations are selected by the ones of time conductors 122 to which conductors 123 and 124 respectively are connected by settings of contactors 73 and 74.

An automatic operating condition establishing relay 127 includes a solenoid 128 and three switches 129, 130 and 131 all of which are spring biased open and are closed by energization of solenoid 128.

The energization circuit of solenoid 128 includes a lead 132 connected through bus lead 105 to power line 93, and a second supply lead 133 that is connected to the fixed contact of normally closed switch 99 of the deactivating relay 97, and through the movable contact of that switch to bus lead 103 and power line 87, so that, assuming solenoid 128 to be energized, it will be open circuited upon energization of solenoid 98, as by momentary deflection of switch operator 67 to "off."

Connected between lead 133 and solenoid 128 are parallel circuit branches, a first one 135 of which includes a switch 136 that is spring biased open and is closable by depression of pushbutton 79 the other branch 137 including switch 131 which serves as a holding switch to maintain solenoid 128 energized after momentary closing and release of switch 136.

A clock motor 141 is connected permanently and directly to power leads 87, 93 through buses 103, 105, so that motor 141 is in operation all of the time that plug 60 is connected to a supply source. Motor 141 drives a time-indicating clock 143 and a selector switch 144, both through a differential gear assembly 145 which operates as follows: Two inputs 146, 147 of the differential gear assembly are respectively connected to motor 141 and to a shaft 148 through which knob 76 positions belts 77 when rotated, and two outputs 149, 150 respectively are connected to drive clock 143 and a timing switch 144. The differential gear assembly is so arranged that, with knob 76 and shaft 148 stationary, motor 141 will drive both clock 143 and switch 144, and while knob 76 and shaft 148 are being manually rotated, to adjust time figures carried by belt 77 relative to time conductors 122, the rotor 151 of switch 144 will be correspondingly driven to a new position relative to clock 143 and motor 141 and corresponding to the new position of belt 77.

Switch 144 is so arranged that rotation of its rotor will successively contact leads 153, of which only four are shown, and which respectively are connected to time conductors 122, at times indicated by the time belt figures that are registered with the different conductors 122. Preferably, though not critically, and for a reason to be explained, the time period during which leads 153 are so contacted are brief, of the order of five minutes.

The function of switch 130 of the automatic condition establishing relay 127 is to connect and disconnect to and from power lead 87 the common contact system 155 of clock driven switch 144, respectively in correlation with energization and deenergization of solenoid 128. To this end one of its contactors is connected by a lead 156 to time switch contact system 155, the other being connected to lead 133, as by a portion of branch lead 137 of holding switch 131, lead 133 being connected through normally closed switch 99 and bus 103 to line 87 as described.

The function of switch 129 has to do with termination of programming and deactivating of the automatic programming device 65 and the receiving set 59 on arrival of time set for termination by position of contactor 74 relative to time conductors 122. One contact of switch 129 is connected to the "off" conductor 124 of device 71 by a lead 158. The other contact of switch 129 is connected by a lead 159 to the same side of deactivating relay solenoid 98 as is the "off" contact 104 of manual station selection operation switch 66, in other words, switch 129 is connected parallel to the "off" contact and contactor of switch 66. By this arrangement and since the opposite side of solenoid 98 is connected to power line 93, contact of the common system 155 of time switch 144 with a time conductor 122 to which "off" conductor 124 is connected by contactor 74, and while solenoid 128 is energized, switch 129 closed, and switch 130 closed, solenoid 98 will be energized from 93 and 105, through 159, 129, 158, 74, the conductor 122 connected to the latter, 155, 156, 130, 137, 133, 99, 103 and 87. Energization of solenoid 98 opens switch 99, resetting the circuit first described, also deenergizing solenoid 128 and thereby opening the holding switch 131 of the latter. Additionally, opening of switch 96 deenergizes solenoid 84, cutting off power to the oscillator supply 88 and cutting off power supply to receptacle 62, both by opening of switch 86. Additionally, opening of switch 85 isolates power conductor 87 from ground, thus breaking the holding circuit of solenoid 84.

The "on time" conductor 123 is connected by a lead 162 to the ground lead 95 of solenoid 84, and so is grounded while switch 96 is closed.

To initiate automatic operation, contactors 73, 74 are set at times of required start and stop of the automatic program, and pushbutton 79 is momentarily depressed energizing solenoid 128 and closing switches 129, 130, 131. In this condition solenoid 84 remains deenergized. Upon contact by clock switch system 155 with the time conductor 122 to which "on" conductor 123 is connected by contactor 73, which results in connection of solenoid 84 to power lead 87 via 95, 162, 123, 73, a time conductor 122, 155, 156, 130, 137, 133, 99, 103, solenoid 84 will be energized conditioning device 65 and set 59 for operation under control of programming device 71. Termination at arrival of time switch contact system 155 with a time conductor 122 to which "off" conductor 124 is connected by contactor 74, has already been described.

The different contactors 112 of stepping switch arrester 111 are connected to corresponding station wires by leads 164, only two of which are shown.

For illuminating neon station indicator lamps 92, a rotary switch 166 is provided, having a rotary body 167 driven by stepping switch moving part 115, and arranged to ground, individually and successively seven contactors 168 that respectively are connected to different lamps 92, by leads 169, only two of which are shown, the different lamps so grounded corresponding to and located adjacent different station conductors 121. Opposite terminals of lamps 92 are connected, while solenoid 84 is energized, to power lead 87, through lead 91, as previously described.

It will be seen that, while any time conductor is connected to time switch contact system 155, although depression of manual station selector pushbutton 68 will effect an advance of stepping switch part 115, release of the pushbutton will result in a back-stepping operation which will return part 115 to the position that it occupied before depression of button 68. For this reason, and since it may become desirable to quickly override the automatic programming previously set up during any half hour period, for example should the particular material reproduced during that period be distasteful, and since break of contact between system 155 and that time conductor 122 will terminate the automatic restoring operation of stepping switch 109, the above-noted brief contact period of system 155 with individual leads 153, say five minutes, is desirable. Thus, except during the initial five minute energization interval, any other station may be selected manually while the system is in the automatic-selection condition without disturbing the programming of the successive half hour intervals. At that succeeding time when the timing matrix shall again be energized the stepping switch will automatically step from its present manual setting to the correct programmed setting.

Limitation of the time periods, to the suggested five minute periods for example, during which stepping switch operation may occur also is the reason for the necessity, mentioned above, for starting operation of automatic programming at a time prior to the time set for commencement of automatic timing, since the "start" conductor 123 is capable of energizing solenoid 84 of the activating relay only while it is in circuit between power conductors 93, 87, and is isolated from the latter unless the time conductor 122 to which it is connected by contactor 73 is in contact with time switch contact system 155.

Fig. 4 is a schematic of the control circuitry of the device being somewhat rearranged as compared to Fig. 3, and simplified by representation of the controlled selector assembly, the stepping switch and part of the program selecting matrix 71 in block form, and by omission of the manual control devices 66, 68 and their circuitry, all for clarification and simplified presentation.

First referring to the program control section, largely shown in block form, the "stepping switch" block 175 is considered as including assemblies 109 and 111, together with solenoid 108 and switch 110 of Fig. 3. It will be seen that this section can be considered as a single circuit having a first terminal 176 which in Fig. 3 is the terminal of solenoid 108 that is connected to lead 90, and a second terminal 177 which in Fig. 3 is the terminal of clock switch 144 that is connected to lead 156. Series connected between these terminals, which are also indicated in Fig. 3, and with reference to that figure are solenoid 108, switch 110, arrester switch 111, the matrix of time and station conductors 122, 124 and timing switch 144. The simplified schematic of Fig. 4, now to be explained in detail relates to circuitry by means of which timed control of program commencement can be effected and the device readied for commencement while in the completely non-operating condition in which it is shown.

Such control is accomplished by the start and stop relays 83, 97, the readying relay 127 and the readying switch 79, 136. It will be noted that each of the solenoids 84, 98 and 128 of the mentioned relays has a terminal, designated a, which is permanently connected to one of the power input terminals of plug 60, respectively through bus 105, bus 105, and bus 105 and lead 132. Each solenoid similarly has a controlled terminal b that is connected to and disconnected from the second power input terminal of plug 60 through the control circuitry now to be described.

It will be seen that to apply energy to the selector actuating or energizing circuit terminals 176, 177, switch 86 of the start relay 83 must be closed, which is effected by energizing solenoid 84 of that relay. The b terminal of solenoid 84 is connected to a pair of controlled circuits, one being through leads 95 and the normally closed switch 96 of the stopping relay 97 to ground, so that it is returned to power input lead 87 while the starting relay switch 85 is closed, thereby constituting a holding circuit for solenoid 84 that is established upon momentary energization of solenoid 84 and that remains established until opening of switch 96 by energization of stopping relay solenoid 98. The other circuit connected to the b terminal of solenoid 84 includes lead 162 and the starting time selecting conductor 123. To select a time for program commencement, contactor 73 is set to connect conductor 123 to the one of time conductors 122 that has that time assigned to it. When that time arrives, that conductor 122 is connected to the second power input terminal lead 87 through time switch 144, lead 156 switch 130 of readying relay 127, which then is closed as will be explained, leads 137 and 133, normally closed switch 99 of stopping relay 97, and bus lead 103.

Termination of automatic programming at a time preset by positioning contactor 74, and accomplished by energization of stopping relay solenoid 98 is effected by the circuitry connected with b terminal of the latter solenoid. This latter terminal is connected by lead 159 to switch 129 of the readying relay 127, the latter switch being closed during programming operation, thence by lead 158 to the time of stop selecting conductor 124. Stopping is accomplished by arrival of time switch 144 at the position wherein it closes circuit with the time conductor 122 connected with stopping conductor 124 by contactor 74. This serves to connect the b terminal of stopping solenoid 98 with the second power input lead 87 through the circuit portions already enumerated, and as in the case of initiating energization of starting relay solenoid 84, through 156, 130, 137, 133, 99, and 103.

The readying relay solenoid 128 is energized by manual closing of switch 79, 136 to condition the device for operation under control of the program selector 71, following a complete non-operating condition of the device. The b terminal of solenoid is connected by lead 135 to switch 79, 136, for connection upon closing of that switch to power input lead 87, through lead 133, the normally closed switch 99 of stopping relay 97 and bus lead 103, so that closing of switch 79, 136 closes switch 129, which readies the stopping solenoid 98 for energization by connection of its b terminal to the stopping time selector conductor 124. It also readies the circuit connected to the b terminal of solenoid 84 for energization by closing switch 130, thereby connecting lead 156 to the second power input terminal lead 87, through 137, 133, closed switch 99, and 103, for energizing solenoid 84 when the circuit is completed from the b terminal of that solenoid to conductor 156 through 95, 162, 123, 73, and a time conductor 122 by arrival of time switch 144 at a position connecting that time conductor 122 to conductor 156. Readying relay switch 131 is a holding switch that maintains solenoid 128 energized after momentary depression of button 79. When closed, it connects the b terminal of solenoid 128 to the input power lead 187 by way of leads 137, 133, normally closed switch 99 of stopping relay 97 and bus lead 103. Upon energization of stopping relay solenoid 97, opening of switch 99 breaks this holding circuit and readying relay solenoid 128 then is deenergized, opening switches 130, 131 to deenergize both the starting and stopping relay solenoids 84 and 98.

It will now be seen that circuitry between terminal 176 and power lead 93, and between terminal 177 and power lead 87, open-biased switches 86 and 130, and closed-biased switch 95 all are connected in series with the terminals between the power leads and function directly to control delivery of electrical power to the terminals; also that switches 99 and 130 function additionally as solenoid energization control switches for purposes of automatic time controlled program starting and stopping. Additionally, the remaining switches 85, 96, 129 and 131 function as solenoid energization control switches and function only indirectly in controlling delivery of energy to terminals 176, 177.

We claim:
1. A control system for an automatic programming device that includes a selector device provided with a control member movable to different positions to select among a corresponding number of different functions, and stepping switch means comprising a first terminal, a series of contacts equal in number to the number of said different positions and means for maintaining all but one, and at each stepping operation changing that one of said contacts in electrical circuit with said terminal, a solenoid and interrupter switch actuator for stepping operation of the latter said means, and circuit means connecting said terminal in series with the switch and one terminal of the solenoid of said actuator; said control system comprising a first set of conductors respectively assignable to different times, a second set of conductors equal in number to the number of said different positions and interrupter switch contacts and respectively connected to the different ones of the latter, means for selectively connecting any of the conductors of said first set to any conductor of said second set thereby to pre-set a program, a time switch including plural contacts equal in number to the number of conductors of said first set and respectively connected to the different ones of the latter, a clock driven contactor movable to successively close with the different said time switch contacts, circuit means connecting the second actuator solenoid terminal with a first, and said time switch contactor with a second of a pair of input terminals for connection to an electric current source, means for preselecting times for commencement and termination of a program at times assigned to any two of the conductors of said first set, the latter said means including an activating switch normally spring biased to an open condition and series connected in the circuit that includes said actuator solenoid and switch, said stepping switch contacts, said time switch contactor, and said circuit means, and an activating relay solenoid that is energizable to close said activating switch, a deactivating relay that includes a deactivating switch that is normally spring biased to a closed position and that is series connected in the same said circuit, and a holding switch that also is normally spring biased to a closed position and that is series connected with one terminal of said activating relay solenoid, and a deactivating relay solenoid that is energizable to open said deactivating and holding switches, a starting conductor and a contactor for selectively connecting it to any one of the conductors of said first set and circuit means connecting said starting conductor to the second terminal of said activating relay solenoid, a stopping wire and means for connecting it selectively to any conductor of said first set, and a pair of circuit leads respectively connecting the different terminals of said deactivating relay solenoid with said stopping conductor and with said first input terminal.

2. A device for automatically selecting, at preselected times and in accordance with a preset program, the different ones of a definite number of certain stations each of which radiates a modulated carrier wave of a different frequency; said device being adapted to connection between a receiving antenna and a conventional demodulating and intelligence reproducing set, and comprising a mixing circuit having a first input for coupling to a receiving antenna, an output for coupling to the antenna circuit input of a said set and a second input; an oscillator having an output coupled to said second mixing circuit input, said oscillator being provided with a movable control member and the frequency of said oscillator being adjustable by movement of said control member to predetermined positions respectively to different frequencies which respectively are related to different ones of said regulated carrier frequencies to heterodyne with them respectively to produce a single frequency to which a set coupled to said mixing circuit output is tunable; a stepping switch having electrically powered actuator means provided with an energizing circuit having a pair of terminals and said switch having a moving part that is mechanically coupled to said oscillator control element for successively moving it to the different said positions while said actuator means circuit is energized; program selective means comprising a first set of plural conductors respectively assignable to different times and a second set of plural conductors respectively corresponding to the different said stations and manually settable connector means for interconnecting conductors of said first set with conductors of said second set in a pattern representative of certain stations of which the radiated programs are to be reproduced at certain times; and time and position control means comprising circuit means including a lead connecting one of said circuit terminals with a first electrical power input terminal, a multi-position selector switch having plural contacts respectively connected with the different conductors of said second set and a contactor connected with the second one of said actuator means circuit terminal and said stepping switch being arranged to successively and individually disconnect said contactor from the ones of said contacts to which the different said stations correspond respectively as said oscillator control element is moved to the different ones of its positions that respectively correspond to the same ones of said stations, and a clock driven selector switch having plural contacts respectively connected to the different conductors of said first set and a contactor connected with a second power input terminal and movable into contacting relation with the different ones of latter contacts respectively upon arrival of times assigned to the conductors to which those contacts are connected, a starting relay comprising a pair of switches normally spring biased to open conditions, and a solenoid that is energizable to close said switches, one of said switches being connected between a said actuator circuit terminal and an input terminal and the other being closable to establish a holding circuit for said solenoid, and a control switch that is closable to energize said solenoid.

3. A device in accordance with claim 2, and including a stopping relay comprising a third switch that is normally biased closed and that is connected in series with said starting relay solenoid and holding circuit switch, a stopping relay solenoid that is energizable to close said third switch, and a second control switch that is closable to energize said stopping relay solenoid.

4. Time controlled starting and stopping means for an automatic programming device that includes means for positioning a function control element in different positions in accordance with a preset time and position program and provided with an energizing circuit having a pair of terminals; said starting and stopping means including a pair of input power leads, a main control switch connected in series with said terminals between said leads, spring means biasing said switch open, a starting relay solenoid that is energizable to close said switch, a starting relay deenergizing switch and spring means biasing it closed, a set of electrical conductors respectively assignable to different times, a starting conductor and means for selectively connecting it to any one of the conductors of said set, circuit means connecting the winding of said solenoid, said starting relay deenergizing switch and said conductor in series with a first one of said power leads, a stopping relay solenoid mechanically connected to said second switch and energizable to open it, a stopping conductor and means for selectively connecting it to any one of the conductors of said set, circuit means connecting the winding of said stopping relay solenoid, said switch and said stopping conductor in series with said first lead, and a clock driven multi-position switch closable successively and individually with the conductors of said set to connect them successively and individually with the second said lead.

5. Time controlled means according to claim 4, and including a holding circuit for said starting relay solenoid and including a first holding switch spring biased open, mechanically connected to said starting relay solenoid and closable by energization of the latter, a second holding switch spring biased closed, mechanically connected with said stopping relay solenoid and openable by energization thereof, and circuit means connecting said holding switches and the winding of said starting relay solenoid in series between said leads.

6. Time controlled means according to claim 4, and including a readying relay provided with a readying relay solenoid and a switch that is spring biased open, mechanically connected with said readying relay solenoid and closable by energization thereof for readying said starting and stopping relays for actuation, and series connected between said clock driven switch and second lead, a manual switch that is spring biased open, and circuit means connecting said manual switch and the winding of said readying relay solenoid in series between said leads.

7. Time controlled means according to claim 4, and including a readying relay provided with a readying relay solenoid, and a stopping relay disabling switch that is spring biased open, mechanically connected to said readying relay solenoid and closable by energization thereof, circuit means connecting said disabling switch in series between said stopping relay solenoid and said stopping conductor, a manually closable switch that is spring biased open, and circuit means connecting said manual switch and the winding of said readying relay solenoid in series between said leads.

8. Time controlled means according to claim 4, and including a readying relay provided with a solenoid, a manually closable switch that is spring biased open and circuit means connecting said manual switch and readying relay solenoid in series between said leads, said readying relay including at least one switch that is spring biased open, mechanically connected to said readying relay solenoid and closable by energization thereof, and that is connected in series between at least one of said starting and stopping conductors and one of said leads, and a holding circuit comprising a switch that is connected parallel to said manual switch, spring biased open, connected mechanically to said readying relay solenoid and closable by energization thereof, and said device including a readying relay deenergizing switch that is spring biased closed, mechanically connected to said stopping relay solenoid and openable by energization thereof, and connected in series between said leads with said solenoid winding and said parallel manual and readying relay holding switches.

9. A device for automatically positioning a multi-position function selector element at preselected times and in accordance with a preset program; said device comprising a pair of power input leads, a stepping switch arrangement comprising a rotatable member that is mechanically connected to said element for stepping it to its different positions, and an actuator circuit including multi-position rotary switch means driven by said member and that is stepped to positions corresponding to those of said element, and multiple terminals that are individually open circuited in the different ones of said positions to arrest rotation of said member; a program setting device including a first set of electrical conductors respectively assignable to different times, a second set of plural conductors respectively assigned to the different positions of said element and respectively connected electrically to the said stepping switch contacts that correspond to the ones of said positions to which they are assigned, and means for selectively connecting each of the contactors of said first set to any one of the contactors of said second set; a clock driven switch having a common terminal, multiple contacts respectively connected to the different conductors of said first set and a contactor that is moved to connect said common terminal to contact the different ones of said multiple contacts at times assigned to the conductors of said first set respectively connected to them; and program starting and stopping control means comprising a starting electrical conductor and means for selectively connecting it to any one of the conductors of said first set, a main program control circuit switch that is spring biased open and circuit means connecting said control switch and actuator circuit in series with a first of said power leads, circuit means connecting said clock driven switch common terminal with the second of said power leads, a starting relay solenoid mechanically connected with said main control switch and energizable to close it, a starting relay deenergizing switch that is spring biased closed, circuit means connecting the winding of said solenoid, and said starting relay deenergizing switch in series between said starting conductor and said first power lead, a stopping relay solenoid connected to said starting relay deenergizing switch and energizable to open it, and circuit means connecting the winding of said stopping relay solenoid in series between said stopping conductor and said first lead.

10. A device according to claim 9, and including a readying relay including a program control circuit readying switch that is series connected between said clock driven switch common terminal and said second lead, and that is spring biased open, a readying relay solenoid connected with said readying switch and that is energizable to close it, and a manual switch that is closable and openable respectively to energize and deenergize said readying relay solenoid.

11. A device according to claim 10, wherein said readying relay includes a holding circuit provided with a holding switch that is normally biased open, mechanically connected to said readying relay solenoid and closable by energization thereof and connected parallel to said manual switch and a holding circuit disabling switch that is spring biased closed, series connected between said leads with the winding of said readying relay solenoid and said parallel manual and holding switches, and that is mechanically connected to said stepping relay solenoid and openable by energization thereof.

12. A device according to claim 9, and including a program control overriding switch that is manually movable from a neutral position to an "on" position or to an "off" position, a first bypass circuit closable by said override switch in its on position to connect said starting relay solenoid winding between said leads, and a second bypass circuit closed by movement of said override switch to its off position to connect the winding of said stepping relay solenoid between said leads.

13. A device according to claim 9, wherein said stepping means actuator circuit includes an actuator solenoid mechanically connected to said member for advancing it one position upon each energization and an interrupter switch series connected with the winding of said actuator solenoid between said first lead and said stepping switch contactor and openable and closable respectively by energization and deenergization of said actuator solenoid winding; and said device including circuit means including a normally open switch that is manually closable to connect said actuator solenoid winding and interrupter switch in series directly between said leads.

References Cited in the file of this patent
UNITED STATES PATENTS 2,068,227    Cutler et al.            Jan. 19, 1937
2,805,331    Wolford               Sept. 3, 1957